March 5, 1968
E. D. CONNER
3,371,722
CULTIVATOR
Filed June 8, 1965
5 Sheets-Sheet 1
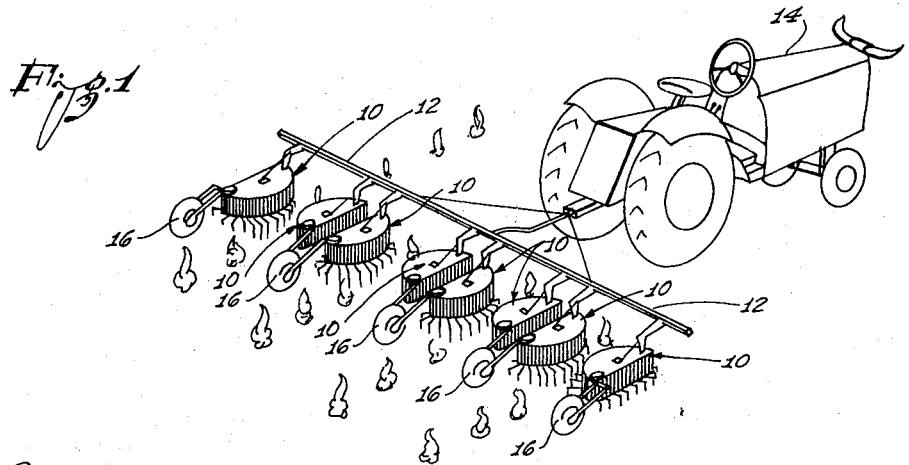
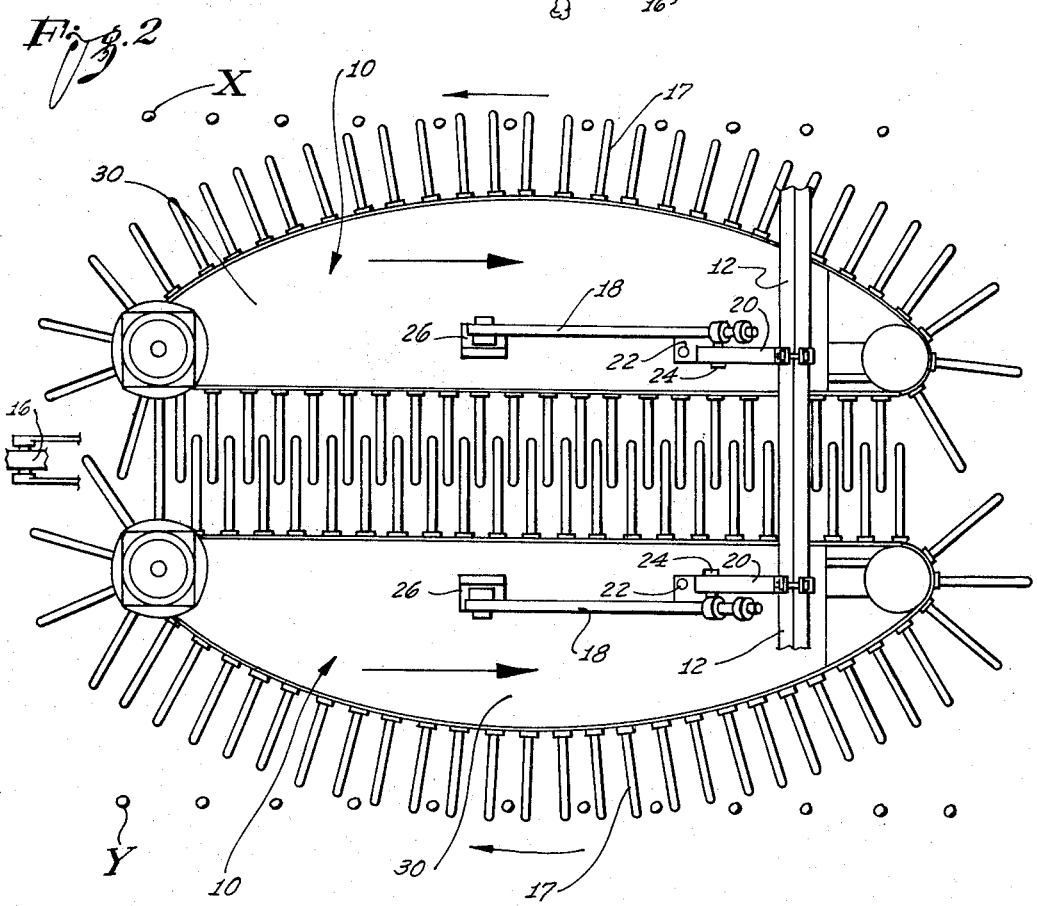
INVENTOR.
Edward D. Conner
By Keith D. Beecher
Attorney March 5, 1968   E. D. CONNER   3,371,722
CULTIVATOR
Filed June 8, 1965   5 Sheets-Sheet 2
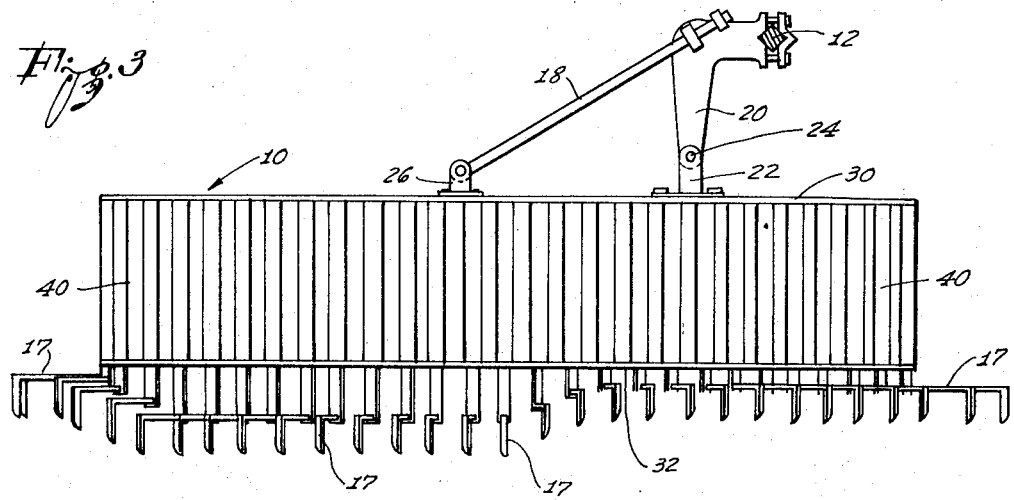
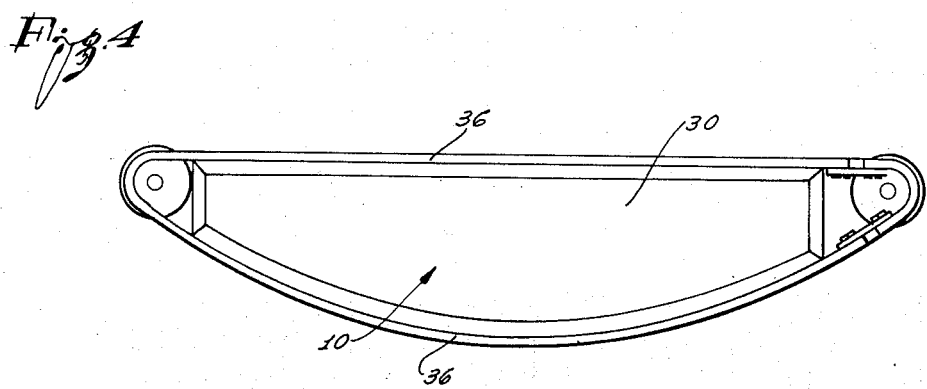
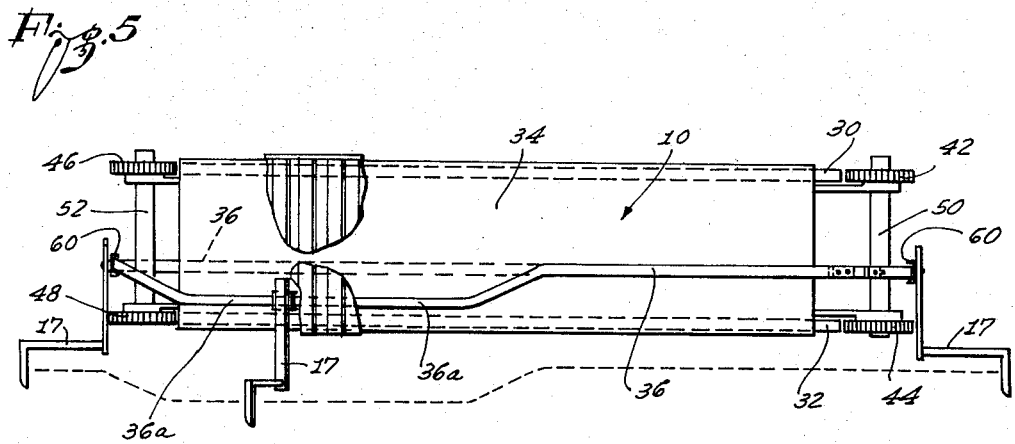
INVENTOR:
Edward D. Conner
By Keith D. Beeler
Attorney INVENTOR.
Edward D. Conner March 5, 1968      E. D. CONNER      3,371,722

CULTIVATOR

Filed June 8, 1965      5 Sheets-Sheet 4

INVENTOR.
Edward D. Conner

By Keith D. Beecher

Attorney

March 5, 1968  E. D. CONNER  3,371,722
CULTIVATOR
Filed June 8, 1965  5 Sheets-Sheet 5
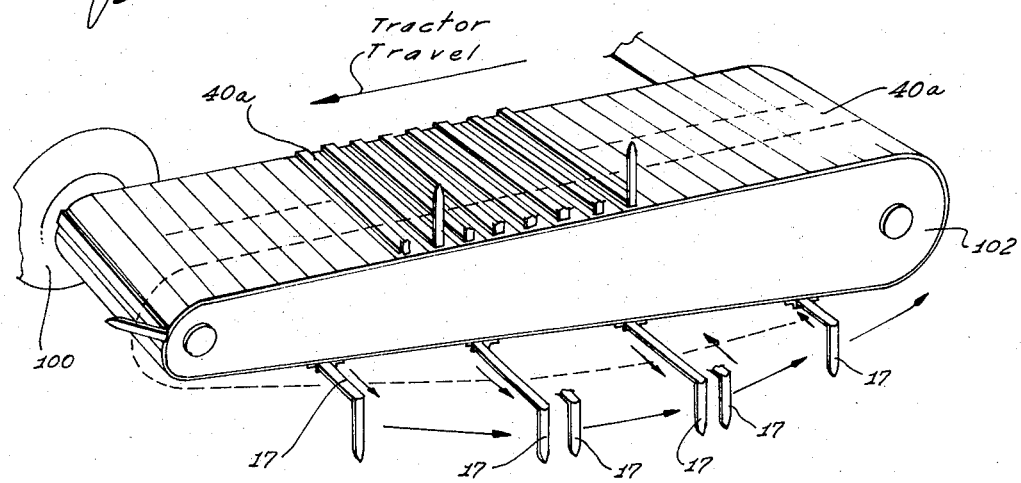
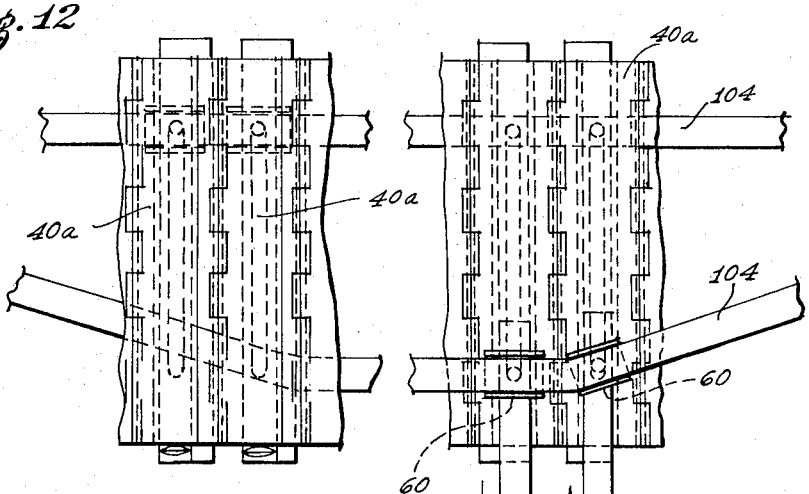
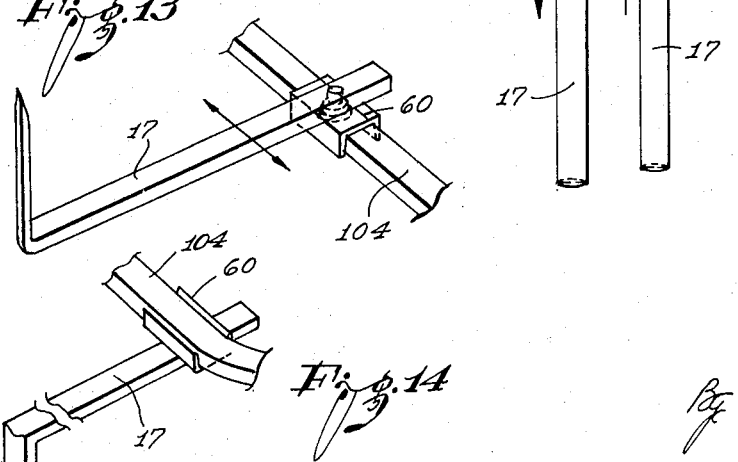
INVENTOR:
Edward D. Conner
By Keith D. Beecher
Attorney

United States Patent Office

3,371,722
Patented Mar. 5, 1968

3,371,722
CULTIVATOR
Edward D. Conner, 2700 Peterson Way, Apt. 9–A,
Costa Mesa, Calif. 94500
Filed June 8, 1965, Ser. No. 462,259
6 Claims. (Cl. 172—546)

ABSTRACT OF THE DISCLOSURE

A cultivating mechanism is described in the following specification which is intended to be drawn, for example, by a tractor, or the like, down a row of crops, and which operates to remove weeds and loosen the soil around the crops, without damaging the crops themselves.

The present invention relates to cultivators, and the like; and it relates more particularly to an improved mechanism for removing weeds and loosening the soil around a growing crop, such as cotton, as the mechanism is drawn along a path adjacent to a row of the crop.

The cultivator of the present invention is of the same general type as the cultivator described and claimed in copending application Ser. No. 427,770 filed Jan. 25, 1965, in the name of the present inventor, and which issued June 6, 1967 as Patent 3,323,599.

The cultivator of the present invention is advantageous in that it is less expensive and easier to mount than the mechanism of the copending application, and in that it requires a minimum of lubrication.

The improved cultivator to be described, like that of the copending application, may be drawn by a tractor, or other means, along a path adjacent the row of the growing crop, as mentioned above.

The cultivator of the invention includes one or more heads. A plurality of fingers are associated with each head. These fingers are mounted on an endless belt, and they travel around the head as the mechanism is moved. Each of the fingers, as was the case in the cultivator of the copending application, may have a hook-shaped hoe-like configuration.

The aforesaid head is constructed so that, as the mechanism is drawn along a path adjacent a row of the crop; the hoe-like fingers move around the head, and the fingers are caused successively to enter and leave the row at right angles to the row. The construction is such that each finger enters and leaves the row without any appreciable sidewise motion.

In the mechanism described in the aforesaid copending application, the cultivator fingers are mounted on a movable rotatable member, and are cammed to the central hub portion of the head. The construction is such that the fingers are caused to pivot about their own vertical axes, and also are caused to move successively downward.

The operation of the mechanism described in the copending application is such that the fingers are caused to enter and leave the row of crops without any appreciable sidewise movement, as the mechanism is drawn down a path adjacent the row and essentially parallel thereto. The operation of the cultivator mechanism described in the copending application is also such that each hoe-like finger is caused to move down into the soil adjacent the crop, as it is being withdrawn from the row, so that it can properly perform its soil pulverizing and weeding function.

In the mechanisms to be described herein, the hoe-like fingers are mounted on a movable belt. Although the precise operation of the mechanism described in the copending application is not achieved, satisfactory cultivating may be effectuated with the mechanism of this invention, which is but a fraction of the cost of the mechanism described and claimed in the copending application.

An object of the present invention, therefore, is to provide an improved, simplified and relatively inexpensive mechanism for cultivating and weeding crops.

Yet another object of the invention is to provide such an improved mechanism which requires no expensive maintenance, and which can be operated without the necessity of any excessive skill on the part of the operator.

Other objects and advantages of the invention will become apparent from a consideration of the following description, when the description is taken in conjunction with the accompanying drawings, in which:

FIGURE 1 is a top perspective view showing a plurality of cultivator heads, each constructed in accordance with the concepts of the present invention, being drawn along paths adjacent to rows of crops by a tractor;

FIGURE 2 is a top plan view of a pair of heads, constructed to embody the present invention;

FIGURE 3 is a side elevational view of one of the heads of FIGURE 2;

FIGURE 4 is a top plan view of one of the heads with the movable components removed;

FIGURE 5 is a side elevational view of the head of FIGURE 4;

FIGURE 10 is a side view of the member of FIGURE 7;

FIGURE 11 is a perspective view of a second embodiment of the invention;

FIGURE 12 is a partial fragmentary top plan view of a portion of the assembly of FIGURE 11; and FIGURES 13 and 14 are fragmentary views showing the manner in which the hoe-like fingers are guided along tracks in the second embodiment.

Figure 6:
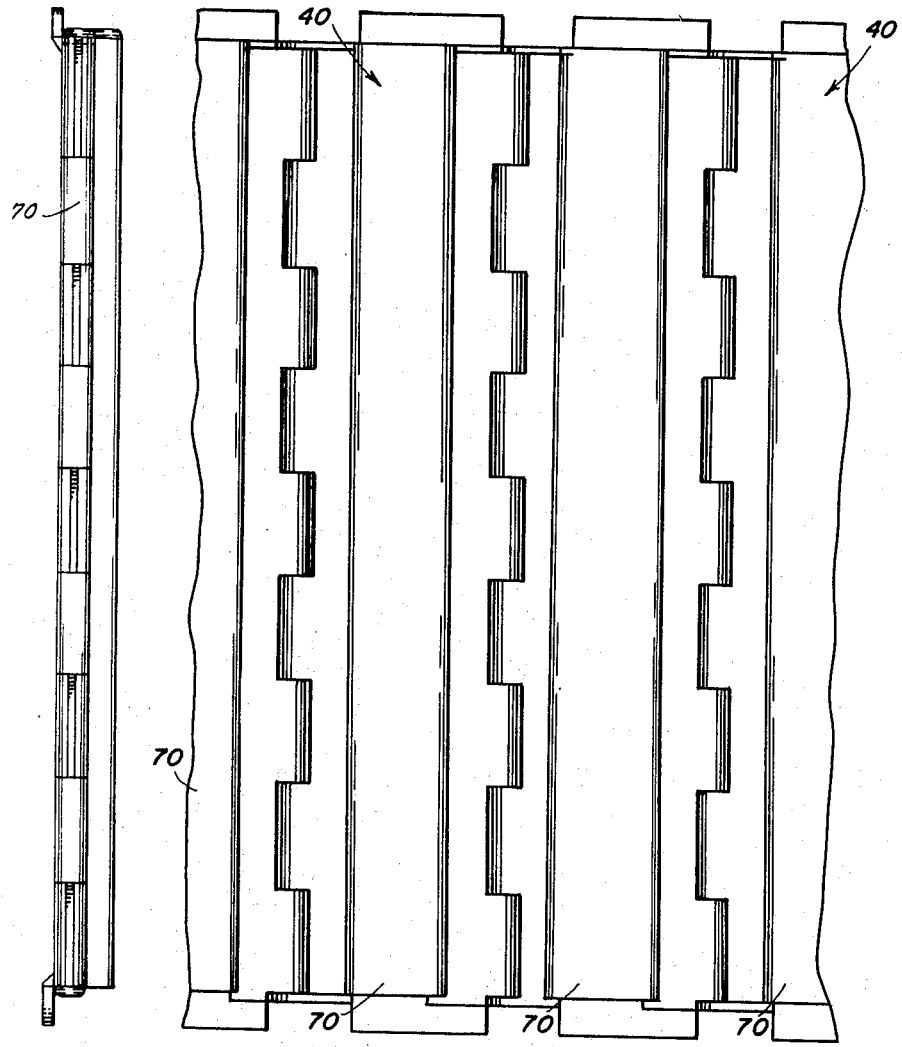
FIGURE 6 is a fragmentary view of a belt-like member which is drawn around the periphery of the head, and which supports a plurality of hoe-like fingers which actually perform the cultivating function.

As shown in FIGURE 1, a multiplicity of heads 10, each constructed in accordance with the invention, may be supported on a transverse horizontal frame beam 12, and the heads may be drawn down the rows of crops by means of a tractor 14.

Appropriate gauge wheels 16 may be provided, and other controls, such as the control rod 18 may be coupled to the tractor, so that the heads 10 may be elevated when not actually performing their cultivating function.

As shown in FIGURE 1, the cultivator heads 10 of the present invention are constructed, so that when such a head is drawn along a path adjacent to a row of crops, a plurality of hoe-like fingers, designated 17, enter and leave the row.

Also, in a manner to be described, each of the hoe-like fingers 17 is guided by the head 10, so that it is moved downwardly into the soil surrounding the crop, after it has entered the row. A subsequent action of the mechanism causes the finger to be withdrawn from the row, while in its down position, so that the soil surrounding the crop is pulverized, and any weeds in the soil are removed by the finger.

It will be appreciated that when the cultivator heads 10 are moved from the left to the right, for example, in FIGURE 2, the hoe-like fingers 17 are caused to move, for example, in a counterclockwise direction on the upper head in FIGURE 2, and in a clockwise direction on the lower head in FIGURE 2. The fingers 17 are drawn around the respective heads 10, as the tractor 14 draws the assembly, and by virtue of their engagement with the soil between the crops.

As better shown in FIGURE 3, the head 10 is supported on the frame beam 12 by means, for example, of an L-shaped bracket 20. The head itself is coupled to the bracket 20 by means of a further bracket 22. The bracket 22 is secured to the top of the head 10, and is pivoted by means, for example, of a pin 24 to the bracket 20.

The control rod 18 is pivotally coupled to a bracket 26 which also is mounted on the top of the head 10. Then, an appropriate control at the tractor causes the rod 18 to be moved so as to pivot the entire head 10 about the pin 24, so as to hoist the head to a disengaged position.

As best shown in FIGURES 4 and 5, the cultivator head 10 includes a top plate 30 and a bottom plate 32. The head 10 also includes a pair of side plates, such as the side plate 34. A track 36 is supported on the side plates, and this track extends completely around the periphery of the head, as shown. The track 36 extends around the head at a particular elevation, with the exception of its portion 36a. The portion 36a of the track is displaced downwardly from the remaining portion of the track.

A movable belt such as designated 40 in FIGURE 3, and which will be described in more detail in conjunction with FIGURES 6-10, extends completely around the head 10. The belt is rotatably supported on the head 10 by wheels 42, 44, 46 and 48. The wheels 42 and 44 are rotatably mounted on a shaft 50, and the wheels 46 and 48 are rotatably mounted on a shaft 52.

The side plates, such as the side plate 34, as well as the top and bottom plates 30, 32 of the head 10 are welded together, and the shafts 50 and 52 are supported by the assembly. The assembly, in turn, is supported on the frame beam 12, in the manner described, and is held at the proper elevation, by its gauge wheel 16, when the mechanism is operating.

The hoe-like fingers 17 have the configuration shown in FIGURES 2, 3 and 5, and these fingers are slidably supported in the individual elongated transverse members making up the belt 40, as will be described. In addition, each finger 17 has a guide 60 pivoted to it, and this guide engages the track 36, and is moved along the track, as the belt 40 is moved around the head 10.

The track 36, therefore, normally holds the fingers 17 in a position displaced up and away from the ground. However, when the fingers are in a position such that they have entered a row of crop, designated X and Y in FIGURE 2, the guides 60 of the particular fingers enter the portion 36a of the track 36 to cause the fingers to move down into the soil. Subsequent action of the mechanism causes the fingers to be drawn back out of the row, while in the down position, so as to perform their soil pulverizing, cultivating and weeding function.

It is intended, for example, that the cultivator of the invention will be used in conjunction with sturdy crops, such as cotton. The cotton has a relatively solid stalk, and one which is relatively high. The fingers 17, when they are moved into the row, are caused to move between the adjacent stalks of the crop, such as cotton, so that no damage to the crop will result, as the fingers are forced down into the soil, and subsequently removed from the crop.

The hoe-like fingers 17 may be loosely mounted in the belt 40, so that should a stalk of the crop be engaged by a finger as it enters the row, the finger is constrained by the stalk of the crop to move to one side, and enter the row to one side of the stalk. In this manner, only weeds, and the like, are withdrawn by the mechanism, as the fingers are subsequently drawn out of the rows.

As best shown in FIGURES 6-10, for example, the belt 40 is made up of a plurality of elongated transverse members 70. As shown in FIGURE 6, the members 70 are shaped, so that their sides may extend into mating relationship with the sides of adjacent members, so as to enable the members to be hinged together in side-by-side relationship by appropriate pins, such as the pin 72 in FIGURE 7.

Figure 8:
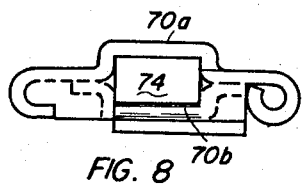
FIGURE 8 is a view of the lower end of the member of FIGURE 7.

Each of the transverse members, and as shown in FIGURE 8, for example, has an outer section 70a and an inner section 70b. These sections are welded to one another, so as to provide a channel 74 in each member, for receiving a corresponding one of the fingers 17.

Figure 7:
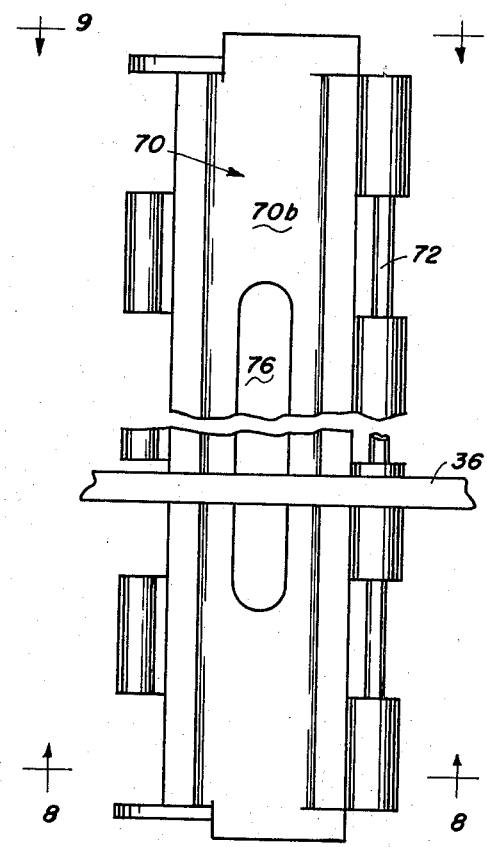
FIGURE 7 is a view of the inner face of one of the elongated members which are hinged together to make up the belt of FIGURE 6.
Figure 9:
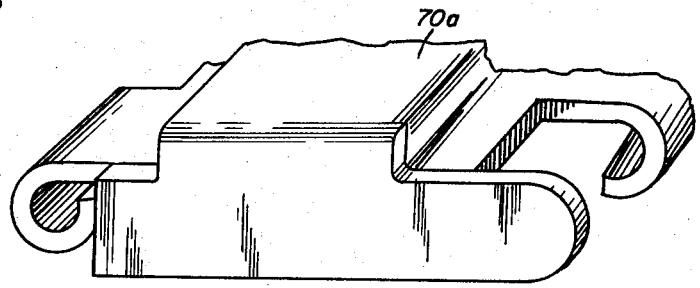
FIGURE 9 is a view of the upper end of the member of FIGURE 7.

As shown in FIGURE 7, a slot 76 is provided in the inner section 70b, so as to permit the guide 60 to extend through the slot 76 and engage the track 36, as mentioned above. The upper end of the individual members may be closed, as illustrated in FIGURE 9.

The embodiment of the invention shown in FIGURES 11-14 is generally similar to that shown in FIGURES 1-10, and described above. However, in the latter embodiment, the hoe-like fingers 17 are caused to move back and forth in a horizontal manner, and these fingers are supported on a belt 40a which is drawn around rollers 100 and 102 which are rotatably mounted on horizontal axes.

As shown in FIGURE 12, the belt 40a may be generally similar to the belt 40 described above. A track 104 is provided, and the pivotally mounted guides 60 on the hoe-like fingers 17 are caused to ride along the track, as also shown in FIGURES 13 and 14.

In the operation of the second embodiment, as the tractor 14 is drawn to the left in FIGURE 11, for example, the fingers 17 are moved down into the soil between the crops, and the engagement of the fingers with the soil causes the assembly to turn about the head. The resulting turning of the belt assembly 40a, causes the fingers to move in and out in a horizontal manner, as shown best in FIGURES 11 and 12, and when they are in their lower position. This permits the hoe-like fingers 17 properly to perform their soil pulverizing and weeding function, in a manner similar to the fingers 17 in the embodiment of FIGURES 1-10.

The invention provides, therefore, an improved and simplified mechanism which is eminently simple, and which comprises essentially a belt which is moved around the cultivator head, as the mechanism is drawn down the row of crop. The hoe-like fingers which are slidably mounted in the members of the belt are caused to move linearly back and forth transversely to the movement of the belt, as the belt is rotated, so that they may properly perform their cultivating function, as described above.

The mechanism of the invention is rugged and durable in its construction, and it requires a minimum of maintenance. Apart from the rollers themselves, there is no lubrication required in the assembly, so that it can be constructed simply and inexpensively.

It will be appreciated, of course, that although two embodiments of the invention have been shown and described, modifications may be made. It is intended in the claims to cover all modifications which fall within the scope of the invention.

What is claimed is:

1. A mechanism for cultivating a row of crops, including: a head; a belt mounted on said head for movement around said head as the mechanism is drawn along a selected path, said belt including a plurality of elongated transverse members hinged to one another in side-by-side relationship; at least one hoe-shaped cultivating finger mounted on said belt and extending transversely thereacross; and guide means mounted on said finger, said finger being mounted on one of said transverse members for slidable movement thereon, and with said guide means extending through a passageway in said one of said transverse members and engaging said head for providing reciprocal linear movement of said finger transversely to the direction of movement of said belt as said belt is moved around said head.

2. The mechanism defined in claim 1 in which said head includes a track extending around its periphery, and in which said guide means mounted on said finger extends through said passageway therein and engages said track to produce said reciprocal linear movement of said finger.

3. The mechanism defined in claim 1 which includes first and second roller means mounted for rotation about respective horizontal axes, and in which said belt is supported on said first and second roller means for movement around said head.

4. The mechanism defined in claim 1 and which includes first and second roller means mounted for rotation about respective vertical axes, and in which said belt is supported on said first and second roller means for movement around said head.

5. A mechanism for cultivating a row of crops, including: a head; a belt mounted on said head for movement around said head as the mechanism is drawn along a selected path, said belt including a plurality of elongated transverse members hinged to one another in side-by-side relationship; a plurality of hoe-shaped cultivating fingers mounted on respective ones of said elongated transverse members of said belt in side-by-side relationship for slidable movement thereon and extending transversely thereacross; and guide means mounted on each of said finger and extending through a passageway in the corresponding one of said transverse members and engaging said head for producing selective reciprocal linear movement of said fingers transversely to the direction of movement of said belt as said belt is moved around said head.

6. The mechanism defined in claim 5 in which said head includes a track extending around the periphery thereof, and in which said guide means on each of said fingers engages said track to produce said selective reciprocal linear movement of said fingers.

References Cited
UNITED STATES PATENTS

| | | | |
|---|---|---|---|
| 987,680 | 3/1911 | Rhodes | 172—93 |
| 1,033,789 | 7/1912 | De Weese | 172—100 X |
| 1,080,993 | 12/1913 | Nagel | 172—100 X |

ABRAHAM G. STONE, *Primary Examiner.*

J. R. OAKS, *Assistant Examiner.*